Oct. 18, 1938.  R. W. BAILEY  2,133,842
INTERNAL COMBUSTION ENGINE
Filed May 3, 1937  3 Sheets-Sheet 1

Inventor:
Richard W. Bailey,
by Harry E. Dunham
His Attorney.

Oct. 18, 1938.  R. W. BAILEY  2,133,842
INTERNAL COMBUSTION ENGINE
Filed May 3, 1937   3 Sheets-Sheet 2
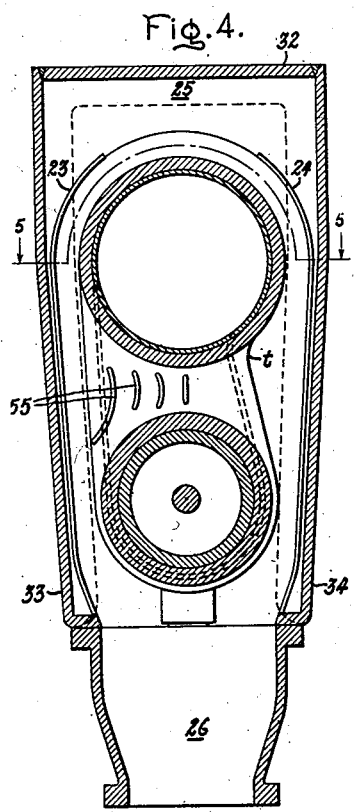
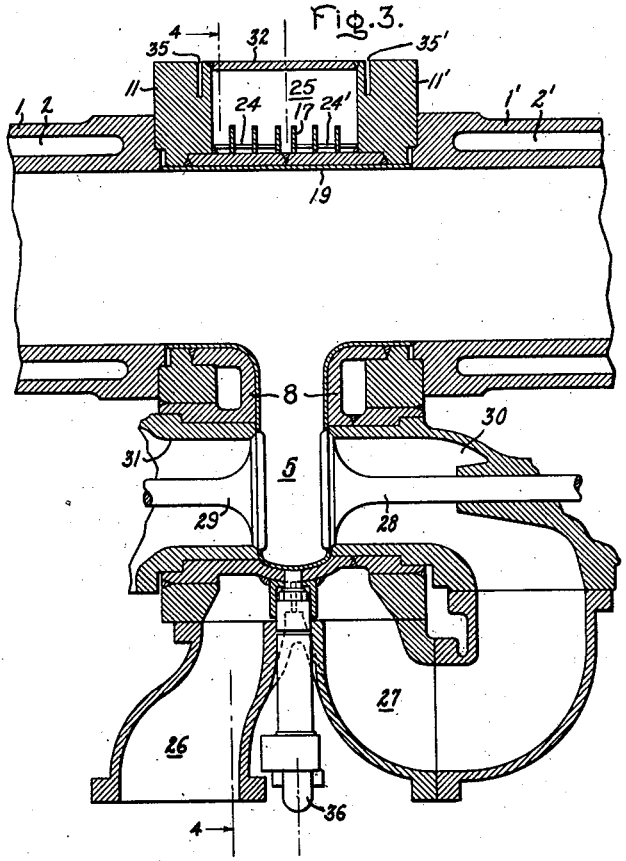
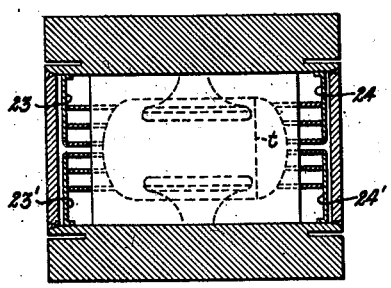
Inventor:
Richard W. Bailey,
by Harry E. Dunham
His Attorney.

Oct. 18, 1938.   R. W. BAILEY   2,133,842
INTERNAL COMBUSTION ENGINE
Filed May 3, 1937   3 Sheets-Sheet 3
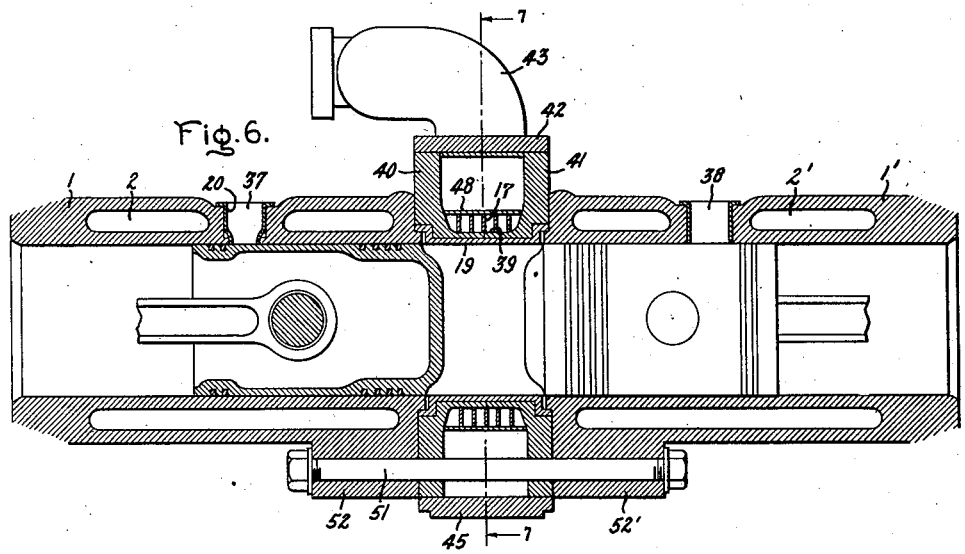
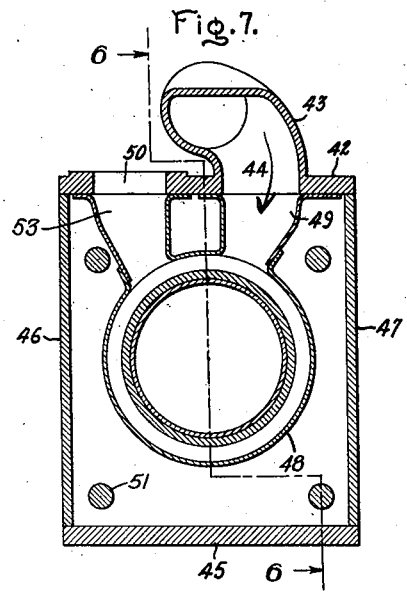
Inventor:
Richard W. Bailey,
by Harry E. Dunham
His Attorney.

Patented Oct. 18, 1938

2,133,842

UNITED STATES PATENT OFFICE 2,133,842

INTERNAL COMBUSTION ENGINE

Richard William Bailey, Hale, England, assignor to General Electric Company, a corporation of New York Application May 3, 1937, Serial No. 140,559
In Great Britain May 7, 1936

4 Claims. (Cl. 123—51)

This invention relates to power plants including internal combustion engines operating as combustion components and operable to convert part of the heat energy released by the combustion of fuel within it into mechanical energy.

More particularly the invention relates to supercharged combustion components of the piston type, having spark or compression ignition, employed in a combustion product power plant of the kind in which the combustion component performs only a relatively small amount, if any, of external work but delivers the products of combustion to an engine performing external work.

With such engines relatively high temperature may be attained in the combustion component and whilst the customary method of water jacketing the cylinder head limits the temperature of the head it does so at the expense of the energy contained in the combustion products.

According to the present invention a supercharged combustion component of the piston type for use in a combustion product plant is provided with ductwork or passageways in the cylinder head or around the combustion space as the case may be through which the compressed air is passed so as to exert a cooling effect, said air being thereafter passed to the cylinder.

If there is an exhaust valve in the head the air is preferably first passed around the region of the valve seat in order to improve the cooling of this valve.

The invention may be applied to cylinders with pistons working opposed in which case the air is passed around the wall of the combustion chamber located between the cylinders. In some cases this chamber may be extended in a direction laterally of the cylinder axis.

In the case of a cylinder with a single piston there will be ducts in the head-end of the cylinder which will, of course, constitute the combustion chamber.

With arrangements according to the invention the heat transmitted to the combustion chamber wall is returned to the motive fluid. Conveniently, screens constituted by plates of heat resisting steel or alloy, e. g. calorized steel, may be secured to the inside of the combustion chamber wall or extend over the surface thereof. Water jacketing of the cylinder side wall will still usually be necessary. An important part of the heat which passes to the cylinder wall will however reach this by way of the piston and the heat transmission through the piston may be minimized by forming the piston with a separate head or cap which is heat insulated to an appreciable degree from the body of the piston.

In the case of a two stroke engine having inlet ports in the cylinder wall the piston head may be somewhat tapered or formed so as to deflect the incoming air axially along the cylinder.

In order that the invention may be clearly understood reference will now be made to the accompanying drawings which show by way of example three embodiments of the invention as applied to compression ignition combustion units having opposed pistons and in which:—

Figure 3 is a longitudinal section of a four-stroke unit having both inlet and exhaust valves located in the wall of a central combustion space.

Fig. 4 is a section on the line 4—4 of Fig. 3.

Fig. 5 is a section on the line 5—5 of Fig. 4.

Fig. 6 is a longitudinal section through the center of a two-stroke unit along lines 6—6 of Fig. 7 in which the inlet valve is constituted by a port in the one cylinder barrel and the exhaust valve by a port in the other cylinder barrel, whilst Fig. 7 is a section on the line 7—7 of Fig. 6.

Figure 1:
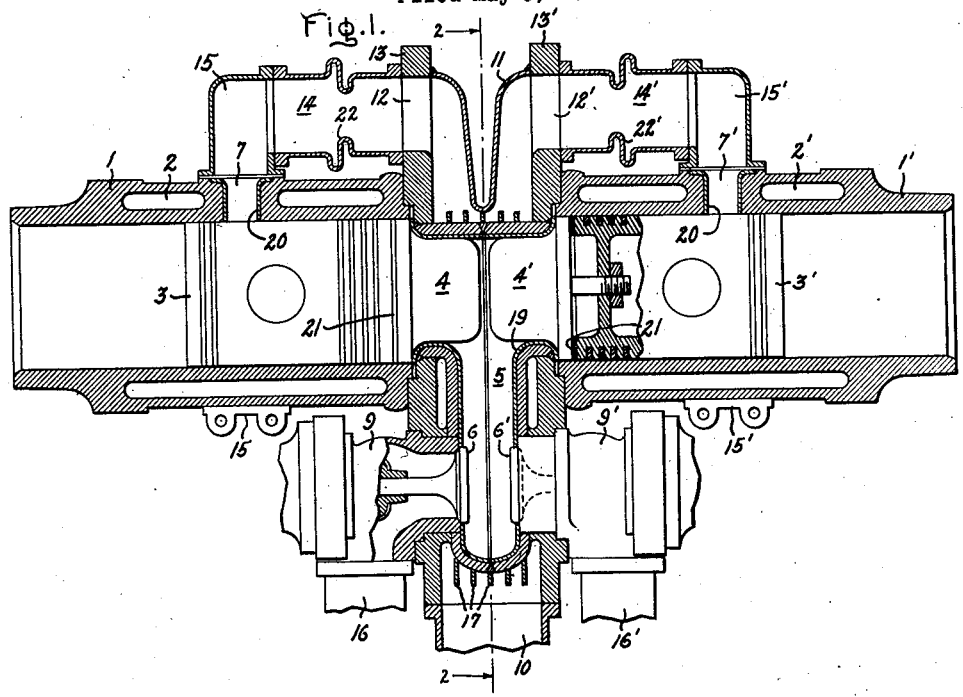
Figure 1 is a longitudinal section (the pistons and valves being in elevation) of a two-stroke cycle combustion unit having inlet ports in the cylinder bore and exhaust valves in the wall of the combustion space at the center.
Figure 2:
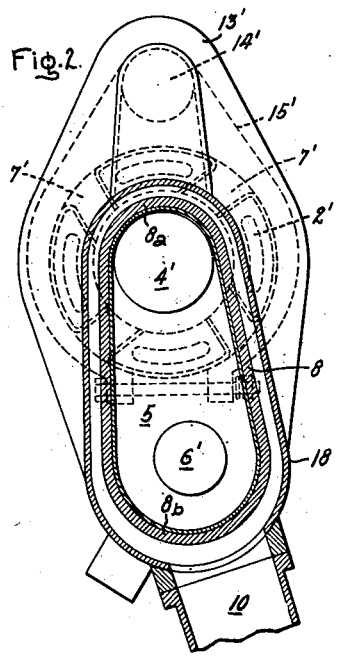
Figure 2 is a cross-section taken laterally on the line 2—2 of Fig. 1.

Referring first of all to Figs. 1 and 2, the references 1, 1' indicate a pair of cylinders arranged in alignment with water cooling spaces 2, 2', in the respective cylinder walls. 3, 3' are the respective pistons, which pistons are formed with detachable heads 4, 4'. As shown the piston heads 4, 4' are separated from each other by a relatively small clearance in their extreme inward position and the combustion space is principally constituted by a space 5 extending laterally from the mid-point of the cylinder assembly. Mushroom or poppet type exhaust valves 6, 6' are located in the opposite walls of the combustion space 5 which lie perpendicular to the cylinder axis so that the valve movements are in a direction parallel to the axis of the cylinders. The inlet valves are constituted by ports 7, 7' in the cylinder walls, which ports are uncovered by the pistons 3, 3' respectively when these are in their extreme outward positions. The combustion space is surrounded by a wall 8, the portion lying immediately between the inner ends of the cylinder walls 1, 1' is surrounded by a cylindrical wall 8a, whilst a portion extends laterally, to the wall 8b to surround the lateral combustion space 5 which is of a substantial rectangular cross-section. Apertures are formed in the opposite sides of the wall portion 8b surrounding the combustion space 5, and these apertures house the ends of the castings 9, 9' constituting valve chambers for the valves 6, 6'.

The incoming air from the compressor or supercharger is admitted through an inlet duct 10 whence it passes around the wall 8 of the combustion chamber so as to cool it. On reaching the opposite side (i. e. top side in the drawing) of the combustion space, the air passes into the forked duct 11 where it divides, part of it passing to the left (Fig. 1) through an opening 12 in the plate 13, whence it passes through a duct 14 to a manifold 15 surrounding the inlet ports 7. The remainder of the air passes to the right through the opening 12' in the plate 13' and then through the duct 14' to the manifold 15' surrounding the inlet ports 7' in the right hand cylinder. It will be observed that the plates 11 are located in lateral planes and are in contact with the inner edges of the cylinder walls.

In constructing the unit the plates 11 may form the main supporting members and the cylinders may be held together in any convenient manner as for example by means of bolts passing through bosses on the outer cylinder surfaces, this part of the construction being omitted in the drawings.

The exhaust gases flow from the combustion space 5 out through the exhaust valves 6, 6' into the exhaust pipes 16, 16'.

The combustion chamber wall 8 is conveniently provided with ribs or fins 17 around its external surface. The outer edges of these ribs are surrounded by a casing 18 extending in a longitudinal direction between the plates 13—13' and closing the channels between the fins so as to form a series of cooling passages. On the upper side (Fig. 1) of the combustion space these cooling passages open into the forked duct 11 which may be made integral with the casing 18. The combustion chamber wall 8 is shown as made up in a composite welded construction in which case the fins 17 may be welded to the outer surface. Alternatively the wall 8 might of course be cast. In such a case however it may be desirable to divide it vertically into two sections for convenience in moulding. The wall 8 is lined with suitable heat resistant material 19, whilst similar heat resistant linings 20 surround the inlet ports. Such lining may be for instance of a suitable heat resistant steel or alloy and the surface of the lining which contacts with the wall 8 may conveniently be grooved or recessed to reduce the contact area and so the heat conduction.

As above stated the piston heads 4, 4' are made detachable from their respective pistons 3, 3', and conveniently some form of thermal insulation, such as stacks of steel plates 21 the surface of which may be oxidized, are interposed between the piston 3 and the head 4 and between the piston 3' and the head 4'. The piston heads may be formed of suitable heat resisting metal and may be secured to the piston proper by any suitable means such as, for example, by a bolt passing through the piston, as shown in Fig. 1. The piston heads 4 are shown of a reduced cross-section and this is for the purpose of deflecting the air axially as it enters the cylinder through the inlet ports.

The ducts 14 and 14' are preferably provided with suitable expansion joints 22 and 22' respectively so as to provide for thermal expansion.

In the arrangement shown in Figs. 3, 4 and 5, which shows the application of the invention to a four-stroke unit, it will be observed that the peripheries of the fins 17 around the left side of the combustion chamber wall (Fig. 3) are covered by plates 23, 24, whilst those on the right side are covered by similar plates 23', 24'; these plates as can be seen from reference to Fig. 4 extend around the fins except at the top end of the cooling passages (i. e. for the position shown in the drawing) at which point the passages between the fins are all in communication with each other. The incoming air is admitted through a duct 26 which communicates only with the left hand cooling passages, i. e. those under the plates 23 and 24, up which the air passes to the space 25 where it passes over and then downwardly through the right hand cooling passages, i. e. those under the plates 23' and 24' to the curved duct 27, whence it is admitted by the inlet valve 28 to the combustion space 5. The valve 29 in the opposite wall of the combustion space acts as the exhaust valve.

The plates 23 and 23' are separated as are also the plates 24 and 24' to avoid strains under high temperatures.

As in the previous arrangement the combustion chamber wall 8 may be of a composite welded construction or may be cast, and in the drawing the left hand side (Fig. 3) is shown as a casting whilst the right hand side is shown as a composite welded structure. The heat resistant lining 19 is again employed. Casings 30 and 31 respectively form the inlet valve chamber and the exhaust valve chamber, the casing 30 being connected to and thereby forming a part of the exhaust duct 27. The space 25 is sealed by means of a plate 32 joining the top edges of the plates 11, 11' and also by means of plates 33 and 34 joining the side edges as shown in Fig. 4.

In the construction shown cuts 35, 35' are formed along the top and side edges of the plates 11, 11', these are for the purpose of avoiding strain when the center portion of the unit expands longitudinally under the high temperatures employed. A fuel injection valve is indicated at 36.

It will be observed that the throat portion t (Fig. 4) of the combustion space 5 where this communicates with the cylinders is somewhat tangential so as to promote a swirl of air therein. Additional deflectors 55 are provided to aid this swirling action.

In Figs. 6 and 7 which show an embodiment of the invention as applied to a two-stroke unit, the port 37 constitutes an inlet valve and the port 38 an exhaust valve. It will be observed that the combustion space lies wholly between the cylinders and is not extended laterally as in the previous arrangements.

In this arrangement the cylinder casings 1, 1' are separated by a composite member comprising a cylindrical wall 39, provided with spaced fins 17, extending between rectangular plates 40 and 41. Plates are attached to the four edges of the plates 40 and 41 to form an enclosure surrounding the cylindrical wall 39. A plate 42 carrying the exhaust pipe 43 and having formed in it an inlet duct 44 is attached to the top edges of the plates 40, 41. A similar plate 45 extends along the lower edges, and plates 46 and 47 extend along the side edges of plates 40, 41. The cylindrical casing 39 forms the wall of the combustion chamber and as in previous arrangements is provided with a lining of heat resistant material 19, whilst heat resistant material 20 is again provided around the inlet and exhaust ports 37 and 38. The fins 17 are surrounded by a thin plate casing 48 whereby cooling passages are formed which are connected to the inlet duct 44 by a connection 49 and to an outlet duct 50 in the same plate 42 by a duct 53, and thereby confine the circulating air to the relatively narrow passages intermediately surrounding the cylindrical wall 39.

It will be seen that the plates 42, 45, 46 and 47 provide an additional seal for the cooling passages. The inlet duct 43 is suitably shaped and communicates with a manifold (not shown) surrounding the inlet ports 37 of which there will usually be several. The unit is clamped together by means of bolts 51 passing through bosses 52, 52' formed around the outside of the respective cylinder casings 1, 1'.

What I claim as new and desire to secure by Letters Patent of the United States, is:

1. A combustion component including a pair of substantially alined cylinders, pistons therein, a combustion chamber between said cylinders extending laterally of the cylinder axis, valves in opposite walls of said chamber, cooling passages surrounding said combustion chamber, and inlet ports opening into said cylinders from said passages whereby heat absorbed from the cylinder head is returned to the cylinders.

2. A combustion component comprising a pair of cylinders, a combustion chamber between said cylinders and extending laterally of the axis of said cylinders, passages surrounding said combustion chamber between said cylinders and the laterally extended portion thereof, and inlet ports connecting said passages to said cylinders, whereby air conducted through said passages returns absorbed heat to said cylinders.

3. A combustion component including a pair of alined cylinders and a pair of opposed pistons therein, a combustion chamber between said cylinders, exhaust valves located in said chamber, and inlet ports in each of said cylinders arranged to be opened when the pistons are in their extreme outward positions.

4. A combustion component comprising a pair of cylinders axially alined and pistons therein arranged opposite each other, a combustion chamber between said cylinders and extending laterally of the axis of said cylinders, and poppet type exhaust valves located in opposite walls of said laterally extending combustion chamber arranged to move in directions substantially parallel to the axis of said cylinders.

RICHARD WILLIAM BAILEY.